United States Patent [19]
Ishigaki

[11] Patent Number: 5,170,411
[45] Date of Patent: Dec. 8, 1992

[54] MODULATION AND DEMODULATION SYSTEM FOR SPREAD SPECTRUM TRANSMISSION

[75] Inventor: Yukinobu Ishigaki, Miura, Japan

[73] Assignee: Victor Company of Japan, Ltd., Yokohama, Japan

[21] Appl. No.: 762,885

[22] Filed: Sep. 19, 1991

[30] Foreign Application Priority Data

Sep. 21, 1990 [JP] Japan .................................. 2-253689

[51] Int. Cl.$^5$ ........................... H04L 9/00; H04K 1/00
[52] U.S. Cl. ......................................................... 375/1
[58] Field of Search ............................................. 375/1

[56] References Cited

U.S. PATENT DOCUMENTS 5,084,899 1/1992 Harrington ............................. 375/1

FOREIGN PATENT DOCUMENTS 3-143042 6/1991 Japan .
3-166833 7/1991 Japan .
3-171843 7/1991 Japan .

*Primary Examiner*—Salvatore Cangialosi
*Attorney, Agent, or Firm*—Michael N. Meller

[57] ABSTRACT

A modulation and demodulation system for spread spectrum transmission comprises modulation and demodulation sections. The modulation section spreads/modulates an input information signal by multiplying by a PN code to provide a spread spectrum signal. The demodulation section despreads/demodulates the spread spectrum signal including interference mixed therein by substantially using the same spread code. In the demodulation section, a first multiplier despreads the received signal by multiplying by the PN code to provide a despread demodulation signal, a high-pass filter extracts a first spread interference signal from the despread demodulation signal, a second multiplier multiplies the spread interference signal by a high-frequency range emphasized PN code, a low-pass filter attenuates high-frequency range components of the output signal of the second multiplier, a third multiplier multiplies the output signal of the low-pass filter by a high-frequency range attenuated PN code, an emphasizing circuit emphasizes low-frequency range components of the output signal of the third multiplier to provide a second spread interference signal, and a subtracter obtains the difference between the second spread interference signal and the despread demodulation signal to provide the interference-free demodulated information signal.

1 Claim, 8 Drawing Sheets

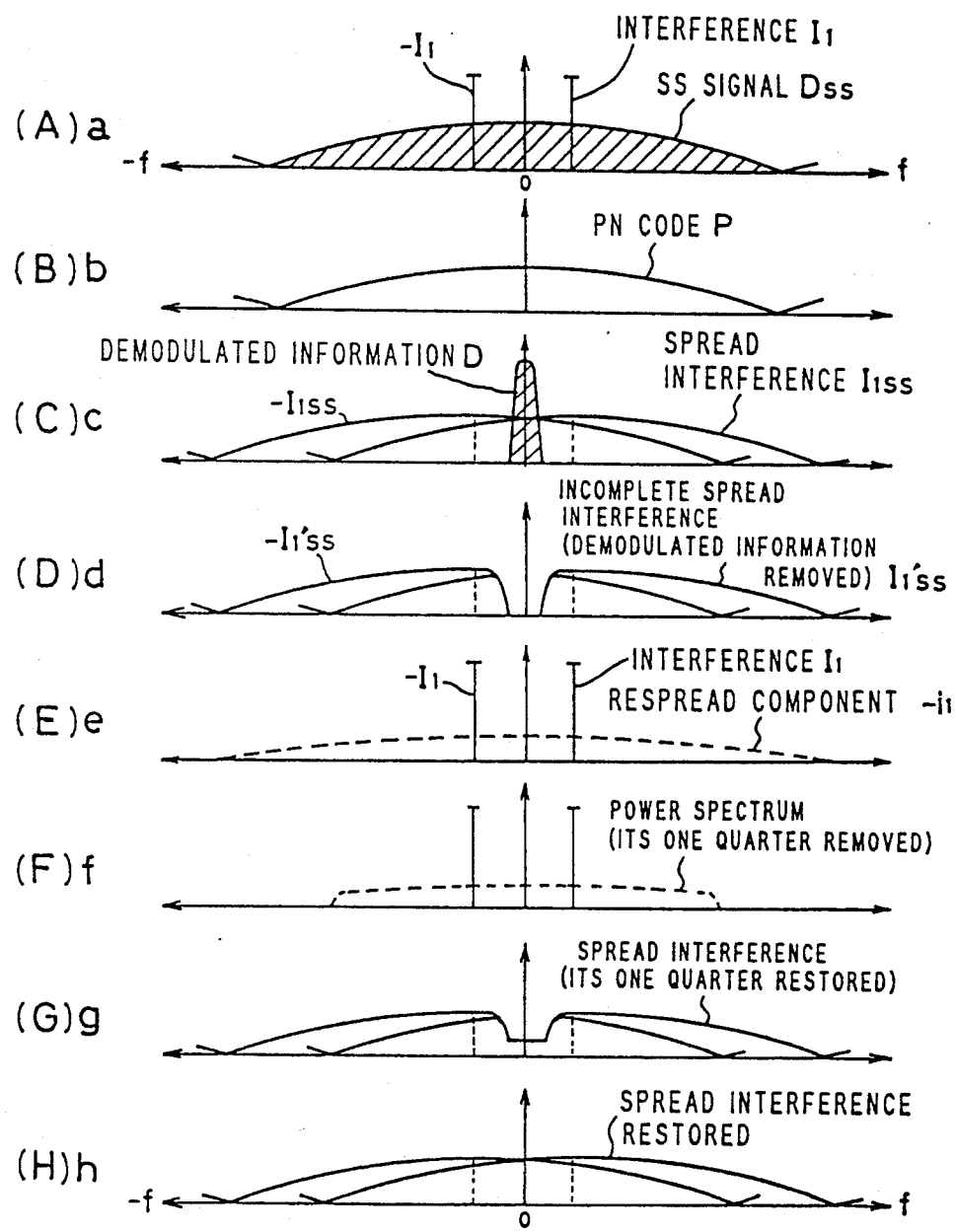

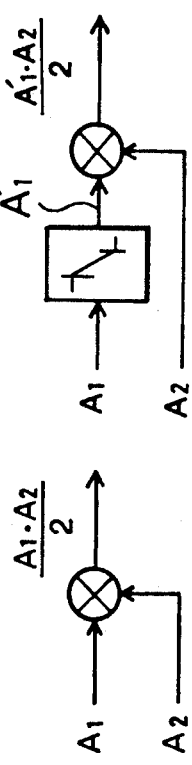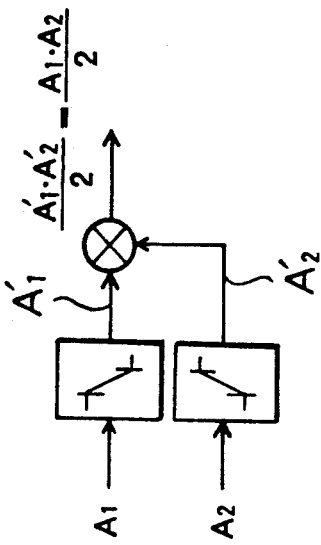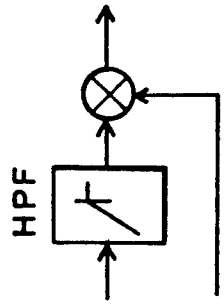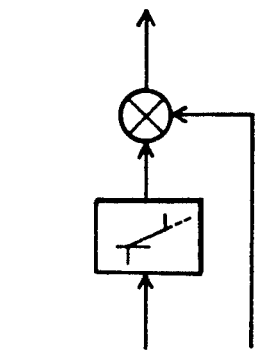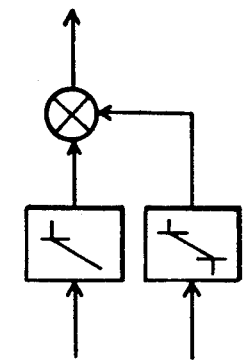
Fig.9(A) Fig.9(B) Fig.9(C) Fig.9(D) Fig.9(E) Fig.9(F)

MODULATION AND DEMODULATION SYSTEM FOR SPREAD SPECTRUM TRANSMISSION

BACKGROUND OF THE INVENTION

1. Field of the Invention

This invention relates to a spread spectrum transmission system and more particularly, to a modulation and demodulation system of simple construction for spread spectrum transmission which is capable of suppressing considerably a variety of jamming, interference or noise unintendedly mixed in a spread spectrum signal received through transmitting means or recording and reproducing mediums and is applicable to preferably packaged media or to broadcasting networks and the like.

2. Description of the Related Art

In the field of information handling, it is important to increase the volume of information to be processed under a given condition. Recently, much effort has been paid to the technology of encoding, modulation and demodulation of information signals in this regard. For example, the multi-level QAM (quadrature amplitude modulation) system was applied to mobile communications for the purpose of increasing the transmission capacity per given frequency bandwidth. Although the number of levels of the QAM was increased from 16 to 256 (16-level QAM to 256-level QAM), in this trend, a further increase to $2^{16}$ (=65536) is conceivable but it seems infeasible because of its system complexity. As an example, if the information handling capacity of the 256-level QAM system was attempted to expand 1.5 times, a 4096-level QAM system would be needed. Therefore, in view of such situations, further innovative study and development will be required in the field of encoding and related modulation and demodulation technology in order to increase the volume of information which can practically be handled.

One known answer to this, is a spread spectrum (abbreviated to "SS") modulation and demodulation system. In this SS modulation and demodulation system, an information signal or the like is SS-modulated on a modulation (transmission) side by a broadband pseudo noise spread code (PN code) so that the signal is spread over a very wide frequency band, and on a demodulation (receiving) side, the received signal is despread by a PN code equivalent to that used on the modulation side. The advantage of the so-called SS communication system based on the foregoing modulation and demodulation technique includes security of communication, high resistance to external interference or noise and to intentional jamming, transmission spectrum compatibility with other communication systems, small transmission power, and high degree of multiplexing information to be transmitted (attained by changing the PN code). Therefore, the SS modulation and demodulation system is increasingly applied nowadays in various field of, for example communication equipment and consumer apparatuses.

The operation principle of the SS modulation and demodulation system or the SS communication system is that in order for suppressing interference (noise or jamming) which is unintendedly mixed in the path between a modulation section (on a transmission side) and a demodulation section (on a reception side), a local noise signal (for cancelling purposes) is produced from a demodulated output signal including the information and the interference components, and arithmetic processing is performed between the demodulated output signal and the local noise signal to restore only the information signal. SS modulation and SS demodulation processings are performed in the modulation section and the demodulation section, respectively.

FIG. 1 shows a fundamental configuration which is in the prior art. In this drawing, 2 and 3 are multipliers, 8 and 9 PN code generating circuits, 10 a modulation section, 11 a low-pass filter (LPF), 17 a substractor, 20' a demodulation section, and 21 a high-pass filter (HPF). Although not included in any practical system, an adder 15 is illustrated for the convenience of describing undesired interference mixed in the transmission path.

Let d(t) represent an information signal and P(t) a PN code. The PN code is usually a pseudo-noise signal. In the modulation section 10, spreading (modulation) is performed by the multiplier 2, resulting in a modulated signal $D_{SS}$ [=d(t)·P(t)]. Letting I(t) represent undesired noise mixed in while the signal is passing through a transmitting path or recording mediums, the input signal to the demodulation section 20' is expressed by d(t)·P(t)+I(t). In the demodulation section 20', despreading (demodulation) is performed by the multiplier 3 using a PN code equivalent to that used in the modulation section 10.

The resulting despread output signal is $$[d(t)\cdot P(t)+I(t)]\times P(t)=d(t)\cdot P^2(t)+I(t)\cdot P(t) \tag{1}$$

Since P(t) is the code taking only a value of either 1 or −1, $P^2(t)=1$. Accordingly, the despread output signal becomes d(t)+I(t)·P(t), that is, there is obtained a mixture of the demodulated information d(t) and the spread noise I(t)·P(t) (produced as noise being spread).

The output signal obtained is passed through the LPF 11 of optimum response, resulting in a demodulated output signal d(t)+n(t) (the foregoing is based on a typical conventional configuration).

On the other hand, if the foregoing signal is passed through the HPF 21 whose cutoff frequency is equal to that of the LPF 11, the output signal of the HPF 21 becomes I(t)·P(t)−n(t). This HPF output signal is applied to a noise processor 25 of the next stage in which the −n(t) part is substantially suppressed, leaving virtually I(t)·P(t) component. Accordingly obtained local spread noise (for cancelling purposes) I(t)·P(t) is applied to the subtracter 17 in which it is subtracted from the despread output signal d(t)+I(t)·P(t) so that the spread noise is cancelled out, resulting in only the information d(t) virtually (this is based on an improved conventional configuration). The noise suppressing characteristic of the demodulation section 20' of the conventional system is illustrated by the curve (a) in FIG. 10.

Since the foregoing operation principle is based on subtraction calculation, it is important to improve the accuracy of the local noise produced. That is, the jamming noise would be cancelled out completely if the waveform, phase and amplitude of the local spread noise were exactly identical with those of the jamming noise. However in reality, a suppression of more than 10 dB can hardly be attained as there is a certain difference between the spread jamming noise and the local spread noise which may be observed on an oscilloscope screen or the like.

Since the foregoing processing is performed over a very wide frequency band, a broadband circuit technology is also required. Since the same frequency range is used commonly by multiple stations because of its nature of the SS communication system, mutual interference is more or less inevitable, thus the performance of one SS communication is degraded if the power of interfering station is very high. In this regard, the reception signal quality can be improved if the power of the transmitting station is increased, but this will cause an increase of interference with other SS communications which can not be disregarded. The conventional system is effective only on SS interference of which the transmission form is known, but not on random noise nor the SS interference of unknown form. To deal with a plurality of SS interference of known forms, there is needed a combination of adders and loop circuits including a plurality of despreading demodulators, narrow-band filters of different passbands, and spreading modulators, this making the circuit configuration very complicated and increasing the system cost.

SUMMARY OF THE INVENTION

It is an object of the present invention to provide a modulation and demodulation system for spread spectrum transmission which can considerably suppress interference such as jamming noise.

To accomplish the foregoing object, the present invention provides a modulation and demodulation system for spread spectrum transmission which comprises a modulation section including a first PN code generating circuit, and a demodulation section including a second PN code generating circuit. The first and second spread code generating circuits generate substantially the same PN code, the modulation section includes spreading unit for spreading/modulation an input information signal by multiplying by a first PN code from the first PN code generating circuit to provide a spread spectrum signal, and the demodulation section includes a despreading unit for receiving the spread spectrum signal from the spreading unit through either a transmitting means or a recording medium and despreading-/demodulating the spread spectrum signal by a second PN code from the second PN code generating circuit.

Specifically, the despreading unit comprises a first multiplier for receiving the spread spectrum (SS) signal with interference mixed therein while the SS signal is passing through either the transmitting means or the recording medium, and despreading the received spread spectrum signal and the interference mixed therein by multiplying by the second PN code to provide a despread demodulation signal, a high-pass filter for producing a first spread interference signal from the despread demodulation signal by blocking a demodulated information signal and demodulated interference components included in the despread demodulation signal and lying in the frequency band of the demodulated information signal, a second multiplier for multiplying the first spread interference signal by a high-frequency range emphasized PN code (produced by emphasizing high-frequency range components of the main lobe of the spectrum of the second PN code) to provide a first multiplied output signal, a low-pass filter for attenuating components of the first multiplied output signal which lie above a medium-frequency of the main lobe of the spectrum of the second PN code, a third multiplier for multiplying the output signal of the low-pass filter by a high-frequency range attenuated PN code (produced by attenuating components of the second PN code which lie above the medium-frequency of the main lobe of the spectrum of the second PN code) to provide a second multiplied output signal, emphasizing circuit for emphasizing low-frequency range components of the second multiplied output signal of the third multiplier to provide a second spread interference signal equivalent to the first spread interference signal included in the despread demodulation signal, and a subtracter for obtaining the difference between the second spread interference signal and the despread demodulation signal to provide the demodulated information signal including substantially no interference components.

BRIEF DESCRIPTION OF THE DRAWINGS

FIGS. 5(A) through (H) are frequency spectrum diagrams relating to FIG. 4;

DETAILED DESCRIPTION OF THE PREFERRED EMBODIMENT

Figure 1:
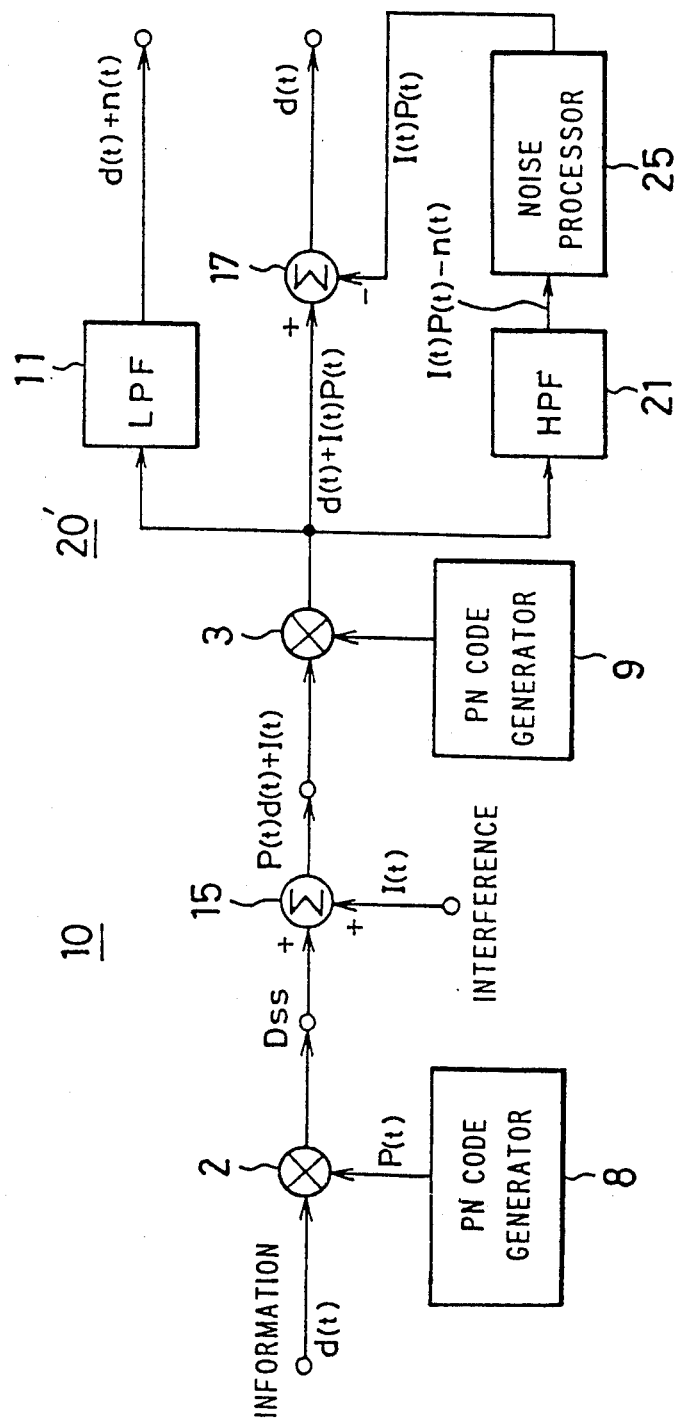
FIG. 1 is a block diagram showing a conventional circuit configuration.
Figure 2:
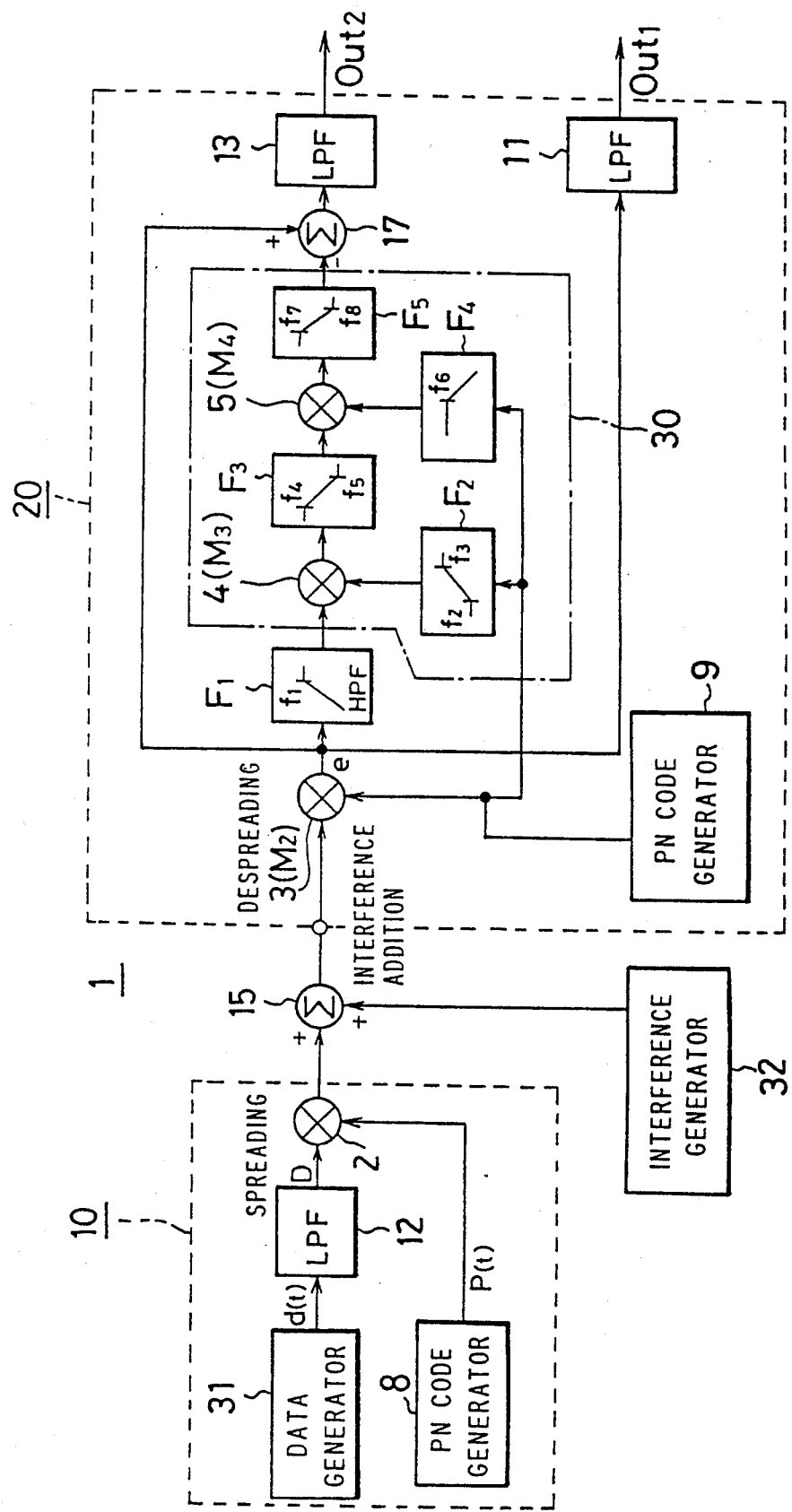
FIG. 2 is a block diagram showing a circuit configuration according to the present invention.

A modulation and demodulation system for spread spectrum transmission according to the present invention will now be described with reference to FIG. 2 and so on. In FIG. 2, elements identical with those of FIG. 1 are designated by the same reference numerals as used in FIG. 1.

In FIG. 2, although a modulation section 10 and a demodulation section 20 are illustrated in separate form for convenience of describing an intrusion of interference (noise or jamming signals) into communication networks, they may be combined into one unit if used for mobile radio communication and the like. In this case, only one PN code generating circuit is provided.

Figure 3:
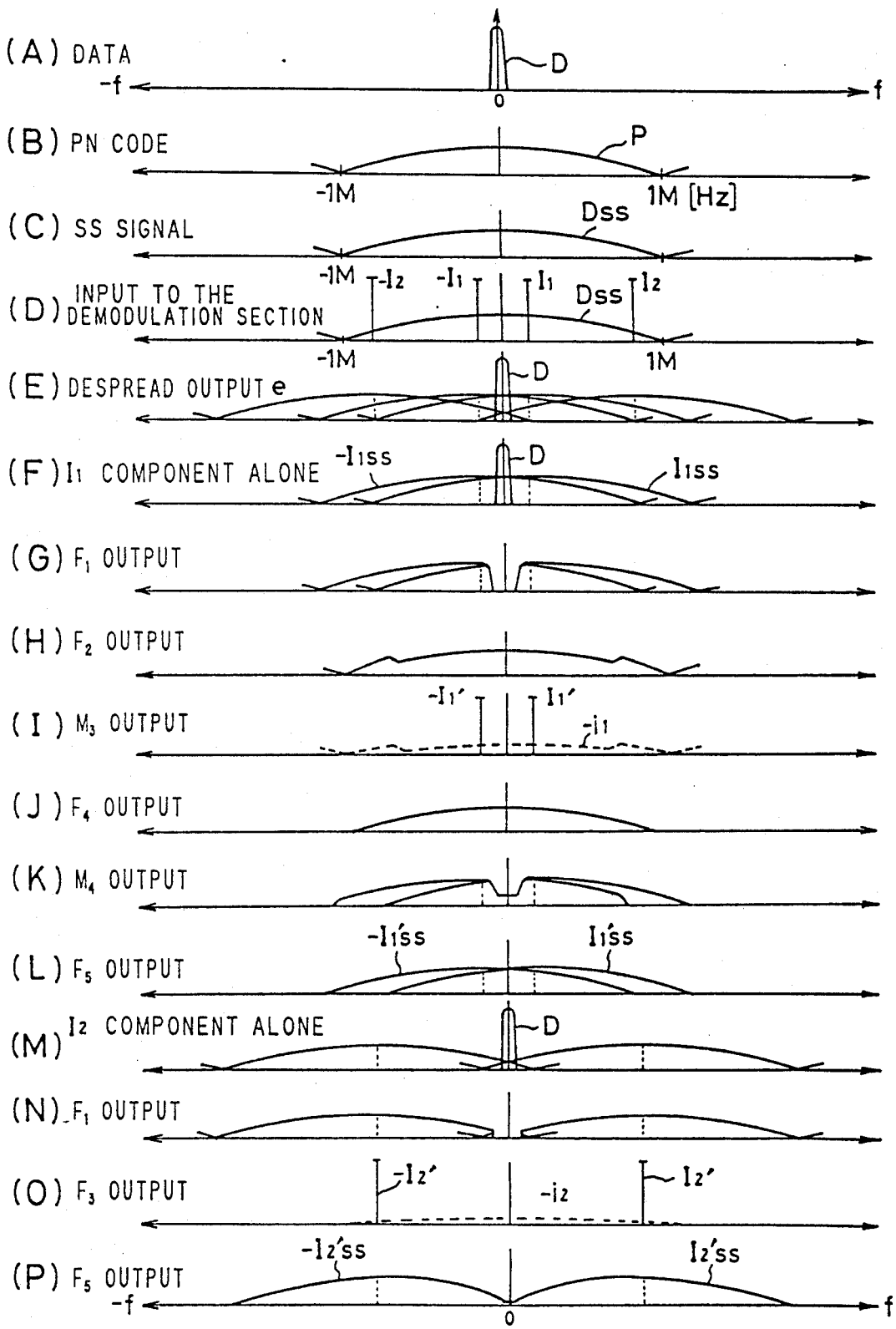
FIGS. 3(A) through (P) are frequency spectrum diagrams relating to FIG. 2.

A data generator (signal source) 31 of the modulation section 10 generates an information signal D [a data signal D=d(t), see FIG. 3(A)] of 3 Kbits/sec. This signal is applied through an LPF 12 (designed in view of code interference) to a multiplier 2 in which spreading is performed by multiplying by a PN code P(t) from a PN code generator 8 to provide an SS signal $D_{SS}$ [=d(t)·P(t), see FIG. 3(C)]. The PN code generator 8 (and 9) uses a 1 MHz clock to provide a pseudo-noise signal of 1023 bits per period [FIG. 3(B) shows a part of the main and side lobes of the PN code].

An interference generator 32 is a means for generating interference for simulating a jamming situation, and in practical SS signal communication or recording and reproducing operations, the interference can be a strong-power signal from other stations, for example. When experimentally generating the interference, a CW (continuous wave) signal generating oscillator or a random noise generating noise generator may be used. Thus generated interference signal is added to the SS signal $D_{SS}$ in an adder 15. In the following description, an interference signal of comparatively low frequency (low-frequency range interference component) $I_1$ and another interference signal of comparatively high frequency (high-frequency range interference component) $I_2$ as shown in FIG. 3(D) represent interference (noise or jamming signals intruded into the SS transmission of the present invention).

The configuration and operation of the demodulation section 20 will be described. 30 is a spread interference generating unit which is composed of four filters $F_2$ through $F_5$ and two multipliers 4 and 5, and forms a substantial part of the demodulation section 20. An LPF 11 is indicated only for the purpose of comparison with the conventional configuration, and its function is identical with that of an LPF 13 (the LPF is not a part of or necessary in the present invention). The LPF 13 (whose cutoff frequency is substantially $f_1$) may be omitted in the present invention, however, the LPF 13 can eliminate small leakage noise generated in circuit portions before a subtracter 17, thus, if provided as illustrated, a demodulated information signal D of high signal-to-noise ratio can be obtained at an output terminal $Out_2$ as a further improvement.

The cutoff frequencies of the filters $F_1$ through $F_5$ are typically as follows:

$f_1 = 14.6$ kHz,
$f_2 = 350$ kHz,
$f_3 = 970$ kHz,
$f_4 = 800$ kHz,
$f_5 = 2.1$ MHz,
$f_6 = 500$ kHz,
$f_7 = 3.65$ kHz,
$f_8 = 14.65$ kHz.

The input signal to the multiplier 3 ($M_2$) of the demodulation section 20 has a spectral forms as shown in FIG. 3(D). In the multiplier 3, despreading is performed by multiplying by the PN code from the PN code generator 9, resulting in a despread output signal e as shown in FIG. 3(E). Since the spectral form of this output signal e is somewhat complicated, to facilitate understanding of the signal processing, the low-frequency range interference components $\pm I_1$ and the high-frequency range interferece components $\pm I_2$ will be considered separately.

If the high-frequency range interference components $\pm I_2$ are omitted from the output signal e, there remains a spectral form as shown in FIG. 3(F). Since the cutoff frequency $f_1$ of the HPF $F_1$ of the next stage is set substantially equal to the upper end of the frequency spectrum of the demodulated information signal D for the purpose of eliminating the signal D included in the despread output signal, the spectral form of the output signal of the filter $F_1$ becomes as shown in FIG. 3(G), this output signal is applied to one input terminal of the multiplier 4 ($M_3$). Applied to the other input terminal of the multiplier 4 is the PN code whose frequency characteristic has been equalized by the filter $F_2$. It should be noted that as shown in FIG. 2, the filter $F_2$ is designed to emphasize its input signal by a factor of about 2 in level in a frequency range above $f_3$ relative to the level below $f_2$ (that is, this filter operates like an equalizer). Therefore, the spectral form of the PN code from the PN code generator 9 becomes as shown in FIG. 3(H). Consequently, the multiplied output signal of the multiplier 4 becomes as shown in FIG. 3(I). Then, since the cutoff frequency $f_4$ of the LPF $F_3$ is as high as 800 kHz, high-frequency range component of the leakage $-i_1$ (respread components of the narrow-band spread interference) included in the output signal of the multiplier 4 is somewhat eliminated; accordingly, there is obtained a spectral form very similar to that of FIG. 3(I) (with regard to "$-i_1$", "$-$" is added because the phase is negative, and "negative" is expressed by the broken line). Thus filtered signal is applied to one input terminal of the multiplier 5 ($M_4$).

The LPF $F_4$ is designed to attenuate a frequency range above its cutoff frequency $f_6$. Therefore, the spectral form of the PN code from the PN code generator 9 becomes as shown in FIG. 3(J). Consequently, the multiplied output signal of the multiplier 5 becomes as shown in FIG. 3(K). As will be clear from comparison between FIG. 3(K) and FIGS. 3(F) and (G), signal components lying substantially in the frequency band of the information signal D are decreased in level to smaller than half. The filter $F_5$ of the next stage (which may be an equalizer) is included to enhance such signal components $\pm I_{1\text{-}ss}$ can be restored as shown in FIG. 3(L). Thus enhanced signal is applied to the subtracter 17 so that the spread low-frequency range interference components $\pm I_{1ss}$ included in the signal e shown in FIG. 3(E) can be cancelled out.

The signal processing of the high-frequency range interference components $\pm I_2$ will be described with reference to FIG. 3(M) and so on. If spread low-frequency range interference components $\pm I_{1ss}$ are omitted from the signal e shown in FIG. 3(E), there remains a spectral form as shown in FIG. 3(M). After the demodulated information signal D is eliminated in the filter $F_1$ of the next stage [see FIG. 3(N)], the PN code [see FIG. 3(H)] from the filter $F_2$ is multiplied in the multiplier 4 ($M_3$). Then, by passing through the filter $F_3$, there obtained a demodulated high-frequency range interference components $\pm I_{2\text{-}ss}$ and a leakage component $-i_2$ as shown in FIG. 3(O). The output signal of the filter $F_3$ is multiplied in the multiplier 5 by the PN code from the filter $F_4$ and then passed through the filter $F_5$ of the next stage, so that spread high-frequency range interference components $\pm I_{2\text{-}ss}$ are restored as shown in FIG. 3(P). Thus restored components are applied to the subtracter 17, so that the spread high-frequency range interference components $\pm I_{2ss}$ included in the signal e shown in FIG. 3(E) are cancelled out. In this way, the foregoing signal processing eliminates all SS interference components irrespective of their frequencies and delivers only the demodulated information signal D out of the output signal e through the subtracter 17.

Figure 4:
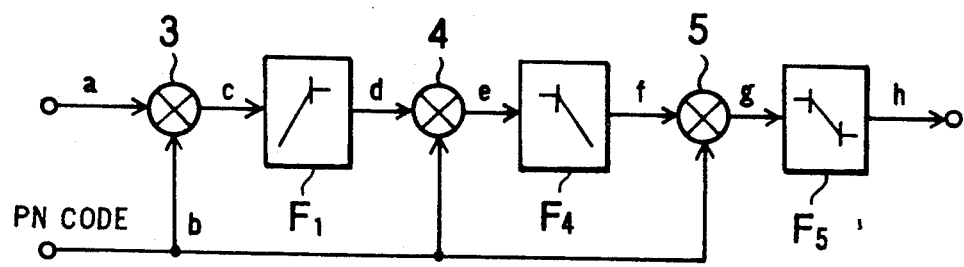
FIGS. 4 and 6 are block diagrams showing an interference spectrum restoring section for low-frequency range.

The operation principle in the demodulation section 20 of restoring an incomplete spread interference spectrum will be described in greater detail. First, with reference to FIG. 4 and 5(A) through (H), the principle of restoring missing components of the spread interference will be described. "Missing" occurs when eliminating the demodulated information signal D which causes inevitably a removal of spread interference components falling in the same frequency range which the eliminated information signal D occupies. In FIG. 4, elements identical with those of FIG. 2 are designated by the same reference numerals as used in FIG. 2.

The input SS signal a shown in FIG. 5(A) is demodulated in the multiplier 3 by multiplying by the PN code b [$=P(t)$], the resulting demodulated output signal c including the demodulated information signal D and the spread interference components $\pm I_{1ss}$ (produced by spreading the interference components $\pm I_1$) as shown in FIG. 5(C). The HPF $F_1$ of the next stage is designed to eliminate the demodulated information signal D (inclusive of interference components lying in a frequency range below the cutoff frequency $f_1$) included in the multiplied (despread) output signal c. Therefore, the output signal of the HPF $F_1$ becomes $\pm I_{1\cdot ss}$ which does not include the demodulated information signal D and a part of the SS interference components $\pm I_{1ss}$ as shown in FIG. 5(D).

The output signal of the HPF $F_1$ is multiplied in the multiplier 4 by the PN code b again, so that as shown in FIG. 5(E), there results in the noise components $\pm I_1$ and respread component $-i_1$ of the narrow-band spread noise. Attenuating the respread components (negative in phase) as much as possible is one of the important features of the system according to the present invention. This is accomplished by eliminating high-frequency range components of the spectrum using the LPF $F_4$ of the next stage whose cutoff frequency is set to $f_6$ which limits the power spectrum (energy) of the respread components to approximately $\frac{3}{4}$. This cutoff frequency $f_6$ is about 500 kHz where the main lobe band of the spectrum of the spread code (sin x/x)$^2$ is 1 MHz. Therefore, the spectral form of the output signal of the filter $F_4$ becomes as shown in FIG. 5(F), and by multiplying in the multiplier 5 of the next stage by the PN code b, $\frac{1}{4}$ of the spectrum is restored correspondingly to a missing portion of the incomplete spread interference as shown in FIG. 5(G). The resulting multiplied output signal g is applied to the filter (equalizer) $F_5$ of the next stage in which the frequency characteristic is compensated for, so that spread interference components equivalent to the spread interference components $\pm I_{1ss}$ shown in FIG. 5(C) are restored as shown in FIG. 5(H). Then, by applying the two signals to the subtracter 17 for subtraction processing, the spread noise components $\pm I_{1ss}$ included in the demodulated signal are eliminated almost completely.

Figure 6:
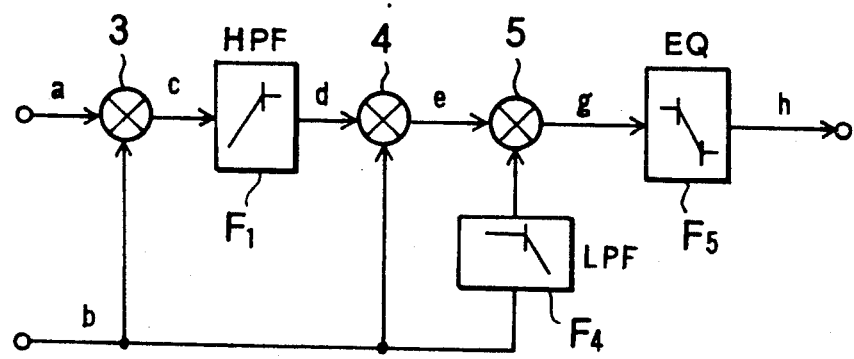

The spread interference generating unit shown in FIG. 4 may be formed as shown in FIG. 6. In this case, the LPF $F_4$ is inserted in the path of supplying the PN code b, so that the PN code, after its power spectrum is attenuated to about $\frac{3}{4}$, is multiplied by the previously multiplied output signal e.

Figure 7A:
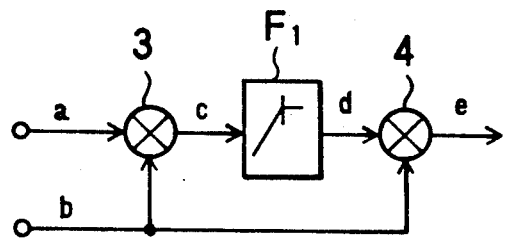
FIGS. 7(A) and (B) and 9(A) through (F) are block diagrams showing an interference spectrum restoring section for high-frequency range.
Figure 7B:
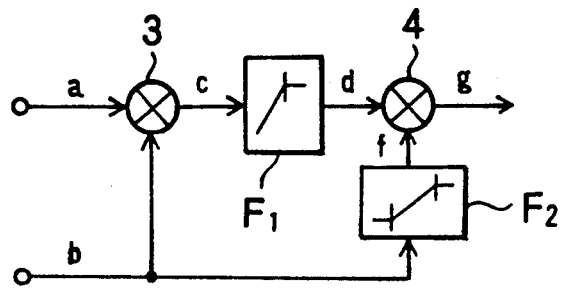

Now, with reference to FIGS. 7(A) and (B), 9(A) through (F) and 8(A) through (G), the principle of restoring missing components of the spread interference will be described. "Missing" occurs when eliminating the demodulated information signal D as described previously. It seems that signal component restoration can be done by replacing the LPF $F_4$ of the circuit for cancelling out the interference mixed into a low-frequency range of the spread frequency band, with a HPF; however, the present applicant has confirmed that this provision causes reverse effect to the cancel of the low-frequency range interference, leading to an insufficient cancelling even in a cutoff-frequency range of the HPF. That is, a satisfactory signal processing (restoration) cannot be accomplished by merely changing the filter characteristic. In FIG. 7, elements identical with those of FIG. 2 are designated by the same reference numerals as used in FIG. 2.

Figure 8:
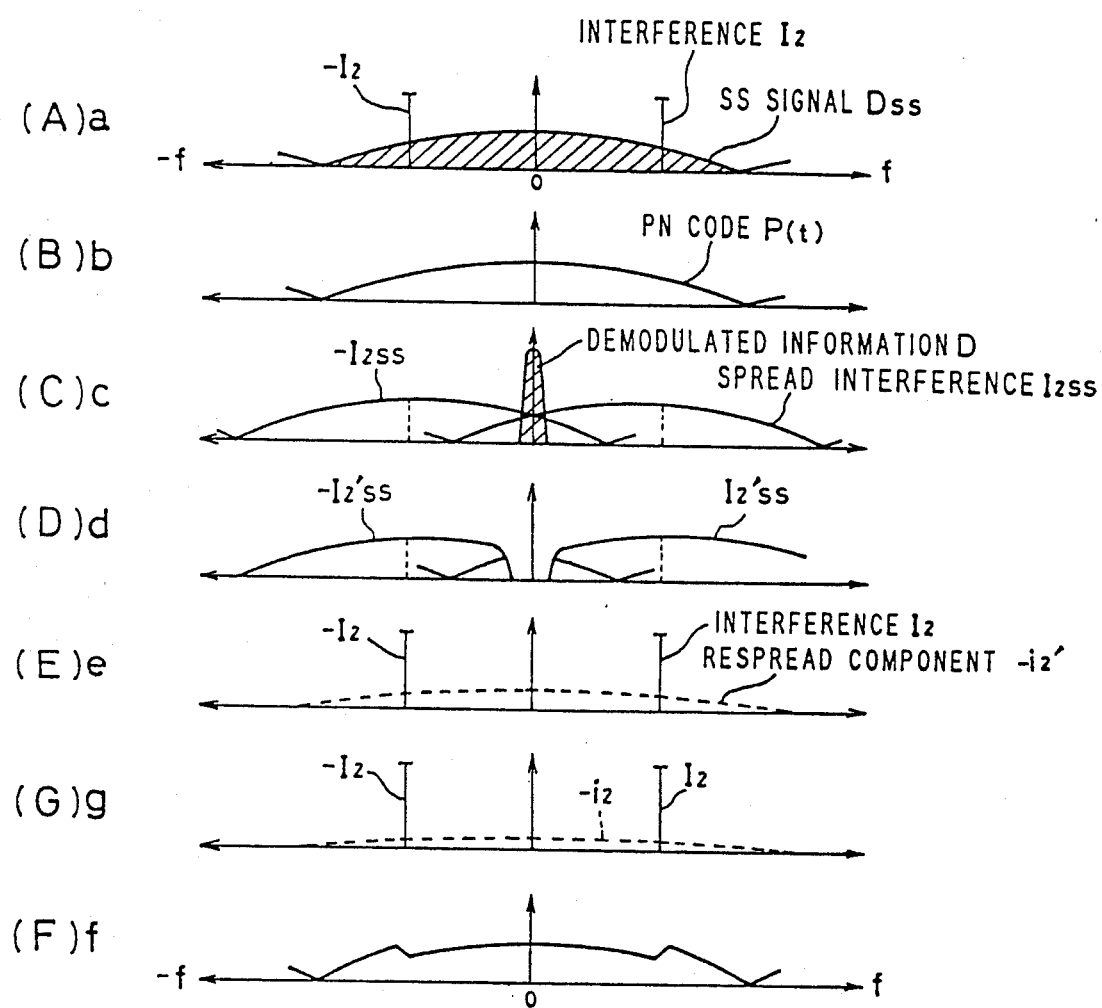
FIGS. 8(A) through (G) are frequency spectrum diagrams relating to FIG. 7.

The input SS signal a shown in FIG. 8(A) is demodulated in the multiplier 3 by multiplying by the PN code b [=P(t)], and as shown in FIG. 8(C), the resulting demodulated output signal includes the demodulated information signal D and the spread interference components $\pm I_{2ss}$ (produced by spreading the interference components $\pm I_2$). The HPF $F_1$ of the next stage is designed to eliminate the demodulated information signal D (inclusive of other signal components falling in the frequency range below the cutoff frequency $f_1$) included in the multiplied (despread) output signal c; therefore, as shown in FIG. 8(D), the output signal of the HPF $F_1$ becomes $\pm I_{2\cdot ss}$, from which a part of the SS interference components $\pm I_{2ss}$ is removed. Then, by multiplying the output signal of the HPF $F_1$ by the PN code b again in the multiplier 4, as shown in FIG. 8(E), there results in the interference components $\pm I_2$ and the respread component $-i_2$. of the narrow-band spread interference. To attenuate the respread components (negative in phase) as much as possible is one of the important features of the system according to the present invention. This will be described with reference to FIG. 9.

In FIG. 9(A), letting $A_1$ and $A_2$ represent the respective amplitudes of the two input signals to the multiplier, the resulting multiplied output signal becomes $A_1 \cdot A_2/2$. In FIG. 9(B), a filter is connected to one input terminal of the multiplier, so that the amplitude of the multiplied output signal is subject to the filter characteristic. In FIG. 9(C), two filters whose characteristics are mutually complementary are connected respectively to the two input terminals of the multiplier, so that the multiplied output signal (amplitude) behave as in the case of FIG. 9(A). Here, the high-frequency portion of the interference alone will be contemplated. On the basis of an assumption that the effect of the HPF of FIG. 9(D) is similar to that of the filter of FIG. 9(E), if the respective characteristics of two filters connected to the two input terminals of the multiplier are selected as illustrated in FIG. 9(F), the influence of the HPF can be compensated for substantially because of such a reason as found in FIG. 9(C). It should be noted that the interference frequency spectrum/distribution of each of the interference $\pm I_2$ extends into the range of the demodulated information signal D, where the frequencies of the interference frequency spectrum is high when referred to the $\pm I_2$ or $-I_2$ as the center frequency of the distribution. Therefore, as shown in FIG. 8(G), the respread component $-i_2$ included in the output signal g of the multiplier 4 of FIG. 7(B) becomes smaller than the respread component $-i_2$. shown in FIG. 8(E). FIG. 8(F) shows the spectrum of the PN code whose high-frequency range components are enhanced by the filter (equalizer) $F_2$, this response being identical with FIG. 3(H).

Thus obtained output signal g of the multiplier 4 is applied to the filter $F_3$ of the next stage shown in FIG. 2. After being processed in the foregoing manner, the spread interference components $\pm I_{2ss}$ included in the demodulated signal are eliminated substantially to nil, so that the demodulated information signal D including no such components can be delivered from the subtracter 17.

Figure 10:
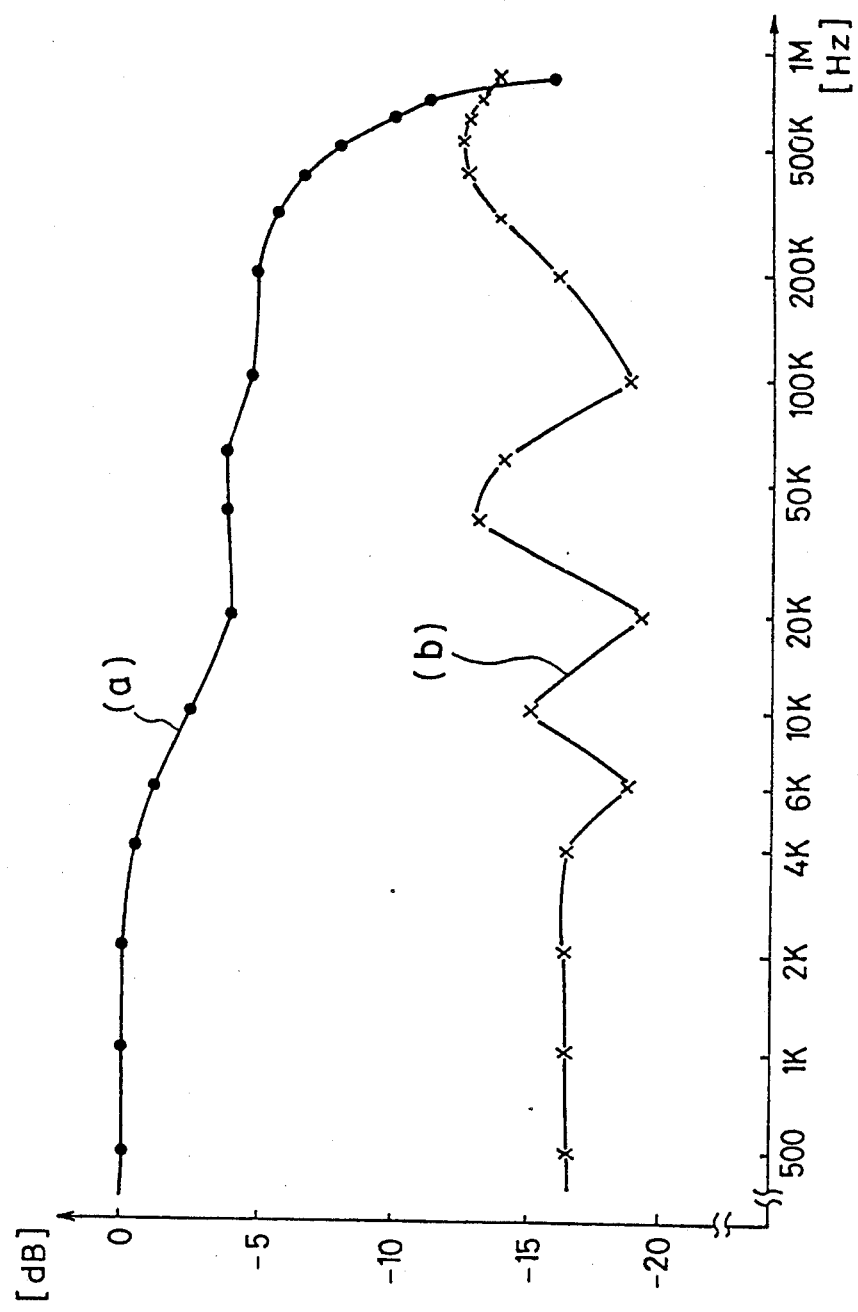
FIG. 10 is a graph showing the characteristics of interference suppression.

The interference suppressing characteristic (demodulated interference characteristic) of the demodulation section 20 in the system according to the present invention is illustrated by the curve (b) in FIG. 10. As will be appreciated from comparison with the curve (a), the system according to the present invention is superior to the conventional system in that the suppressing characteristic is considerably improved, especially in the relatively low-frequency range.

Although the foregoing description has dealt with the information signal D as generated in the modulation section 10, the signal may be of other types, such as FM-modulated (data) signals or PSK-modulated (data) signals.

As described in the foregoing, the modulation and demodulation system for spread spectrum transmission according to the present invention can eliminate or suppress substantially all interferences of low/high frequency with strong power, as well as CW signal (of single wave) and random noise, markedly as compared to the prior art.

What is claimed is:

1. A modulation and demodulation system for spread spectrum transmission comprising a modulation section including a first pseudo noise (PN) code generating circuit, and a demodulation section including a second PN code generating circuit, wherein said first and second PN code generating circuits generate substantially identical PN codes, said modulation section includes spreading means for spreading and modulating an input information signal by multiplying by a first PN code from said first PN code generating circuit to provide a spread spectrum signal, and said demodulation section includes a despreading means for receiving said spread spectrum signal from said spreading means through one of a transmission means or a recording medium and despreading and demodulating said spread spectrum signal by a second PN code from said second PN code generating circuit, wherein said despreading means comprises;

- first emphasizing means (F2) for emphasizing high-frequency components of said second PN code higher than a predetermined frequency to produce a high-frequency range emphasized PN code,
- attenuating means (F4) for attenuating high-frequency components of said second PN code higher than said predetermined frequency to produce a high-frequency range attenuated PN code,
- a first multiplier (3) for receiving said spread spectrum signal with interference unintentionally mixed therein through said one of said transmission means or said recording medium, and despreading said spread spectrum signal and said interference mixed therein by multiplying by said second PN code to provide a despread demodulation signal,
- a high-pass filter ($F_1$) for producing a first spread interference signal from said despread demodulation signal by blocking a demodulated information signal and demodulated interference components both included in said despread demodulation signal, said interference components lying in a frequency band of said demodulated information signal,
- a second multiplier (4) for multiplying said first spread interference signal by said high-frequency range emphasized PN code to provide a first multiplied output signal,
- a low-pass filter ($F_3$) for attenuating components of said first multiplied output signal, which lie above said predetermined frequency,
- a third multiplier (5) for multiplying an output signal of said low-pass filter by said high-frequency range attenuated PN code to provide a second multiplied output signal,
- second emphasizing means ($F_5$) for emphasizing components of said second multiplied output signal in a low-frequency range which corresponds to a frequency range blocked by said high-pass filter ($F_1$), to provide a second spread interference signal equivalent to said first spread interference signal included in said despread demodulation signal, and
- a subtracter of obtaining a difference between said second spread interference signal and said despread demodulation signal to provide said demodulated information signal including substantially no interference components.

* * * * *